United States Patent
Hsu et al.

(10) Patent No.: US 11,528,788 B1
(45) Date of Patent: Dec. 13, 2022

(54) LIGHT-EMITTING DIODE LIGHTING DEVICE WHICH IMPROVES LINE REGULATION

(71) Applicant: Chiplight Technology (Shenzhen) Co., Ltd., Shenzhen (CN)

(72) Inventors: Horng-Bin Hsu, Taipei (TW); Yi-Mei Li, New Taipei (TW); Pen-Li Chou, Taipei (TW)

(73) Assignee: Chiplight Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 17/380,042

(22) Filed: Jul. 20, 2021

(30) Foreign Application Priority Data

May 21, 2021 (CN) .......................... 202110559731.X

(51) Int. Cl.
*H05B 45/345* (2020.01)
*H05B 45/37* (2020.01)

(52) U.S. Cl.
CPC ........... *H05B 45/345* (2020.01); *H05B 45/37* (2020.01)

(58) Field of Classification Search
CPC .............................. H05B 45/345; H05B 45/37
See application file for complete search history.

(56) References Cited

U.S. PATENT DOCUMENTS

| 10,531,533 | B1* | 1/2020 | Hsu ........................ H05B 45/10 |
| 10,568,173 | B1* | 2/2020 | Hsu ........................ H05B 45/37 |
| 2012/0133291 | A1 | 5/2012 | Kitagawa | |
| 2015/0312982 | A1 | 10/2015 | Melanson | |
| 2020/0084851 | A1* | 3/2020 | Kuo ........................ H05B 45/20 |
| 2020/0245432 | A1* | 7/2020 | Lee ........................ H05B 45/10 |

FOREIGN PATENT DOCUMENTS

| CN | 103428969 A | 12/2013 |
| CN | 109041348 A | 12/2018 |
| TW | M447061 U1 | 2/2013 |
| TW | 201433742 A | 9/2014 |

* cited by examiner

*Primary Examiner* — Minh D A
(74) *Attorney, Agent, or Firm* — Winston Hsu

(57) ABSTRACT

An LED lighting device includes a luminescent device driven by a rectified AC voltage, a current detecting circuit, a current regulating circuit, and a duty cycle detecting circuit. The current regulating circuit is configured to provide a regulating current so that the current flowing through the luminescent device does not exceed the regulating current. The current detecting circuit is configured to monitor the value of the regulating current, and the duty cycle detecting circuit is configured to monitor the duty cycle of the regulating current. The present invention can improve the overall line regulation of the LED lighting device when the rectified AC voltage somehow fluctuates between its upper bound and lower bound.

20 Claims, 7 Drawing Sheets

LIGHT-EMITTING DIODE LIGHTING DEVICE WHICH IMPROVES LINE REGULATION

CROSS REFERENCE TO RELATED APPLICATION

This Applications claims the benefit of China application No. 202110559731.X filed on 2021 May 21.

BACKGROUND OF THE INVENTION

1. Field of the Invention

The present invention is related to an LED lighting device, and more particularly, to an LED lighting device for improving line regulation.

2. Description of the Prior Art

A light emitting diode (LED) lighting device directly driven by a rectified alternative-current (AC) voltage usually adopts a plurality of LEDs coupled in series in order to provide required luminance.

Since the current flowing through an LED varies with the rectified AC voltage, line regulation is the ability of the LED lighting device to exhibit little change in brightness or power as the rectified AC voltage fluctuates. When the rectified AC voltage increases, the LED current also increases accordingly, thereby resulting in inaccurate current levels under different voltage conditions and over heat due to larger power consumption. Therefore, there is a need for an LED lighting device capable of improving line regulation.

SUMMARY OF THE INVENTION

The present invention provides an LED lighting device which includes a current detecting circuit, a duty cycle detecting circuit and a current regulating circuit for improving line regulation. The current detecting circuit is configured to monitor a first current and provide a feedback voltage associated with the first current. The duty cycle detecting circuit is configured to monitor a duty cycle of the first current and provide a control signal associated with the duty cycle of the first current. The current regulating circuit is configured to provide the first current for regulating a second current so that a value of the second current does not exceed a value the first current and adjust the value of the first current according to the feedback voltage and the control signal, wherein the second current flows through a luminescent device driven by a rectified AC voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
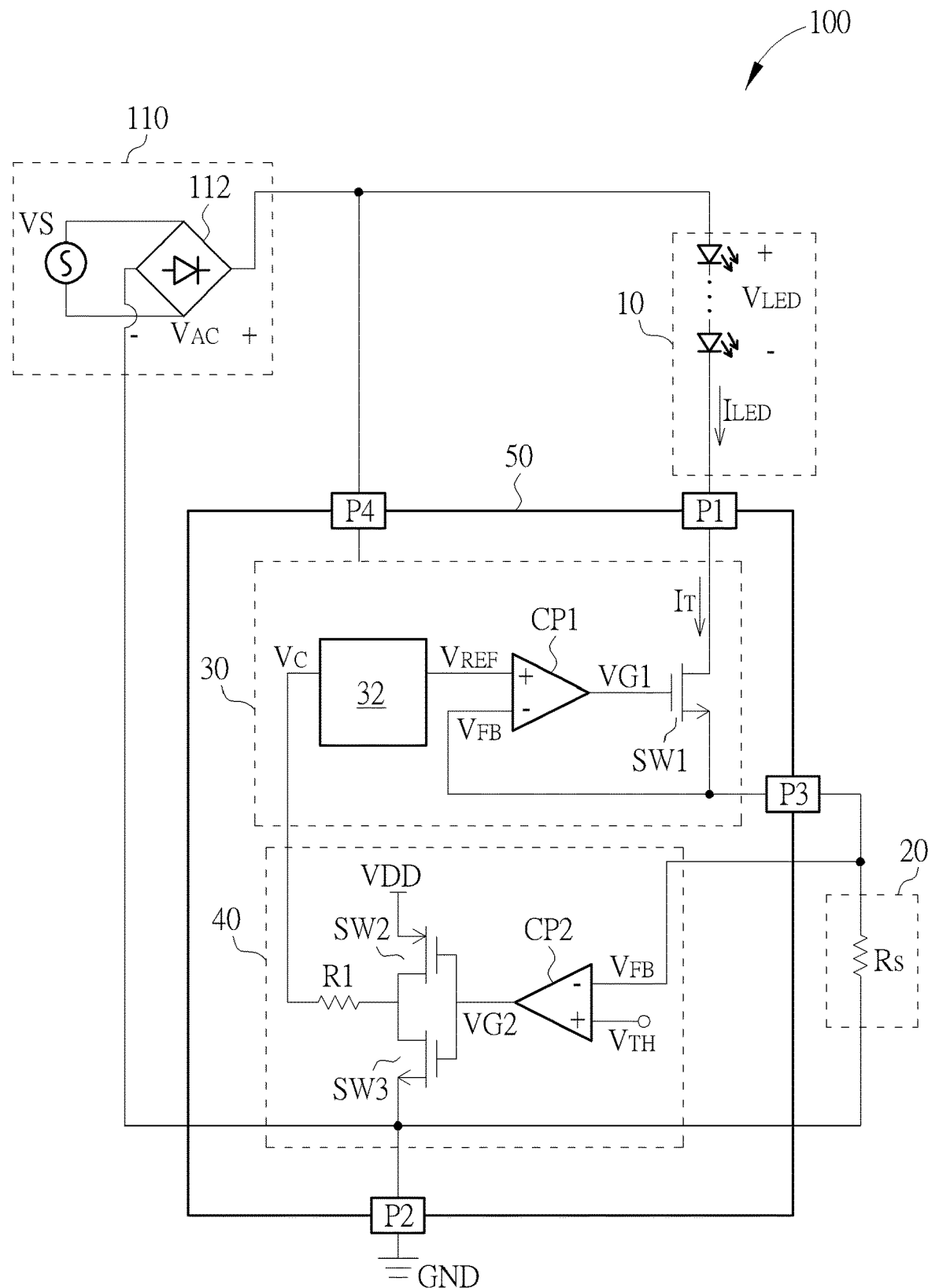
FIG. 1 is a diagram of an LED lighting device according to an embodiment of the present invention.
Figure 2:
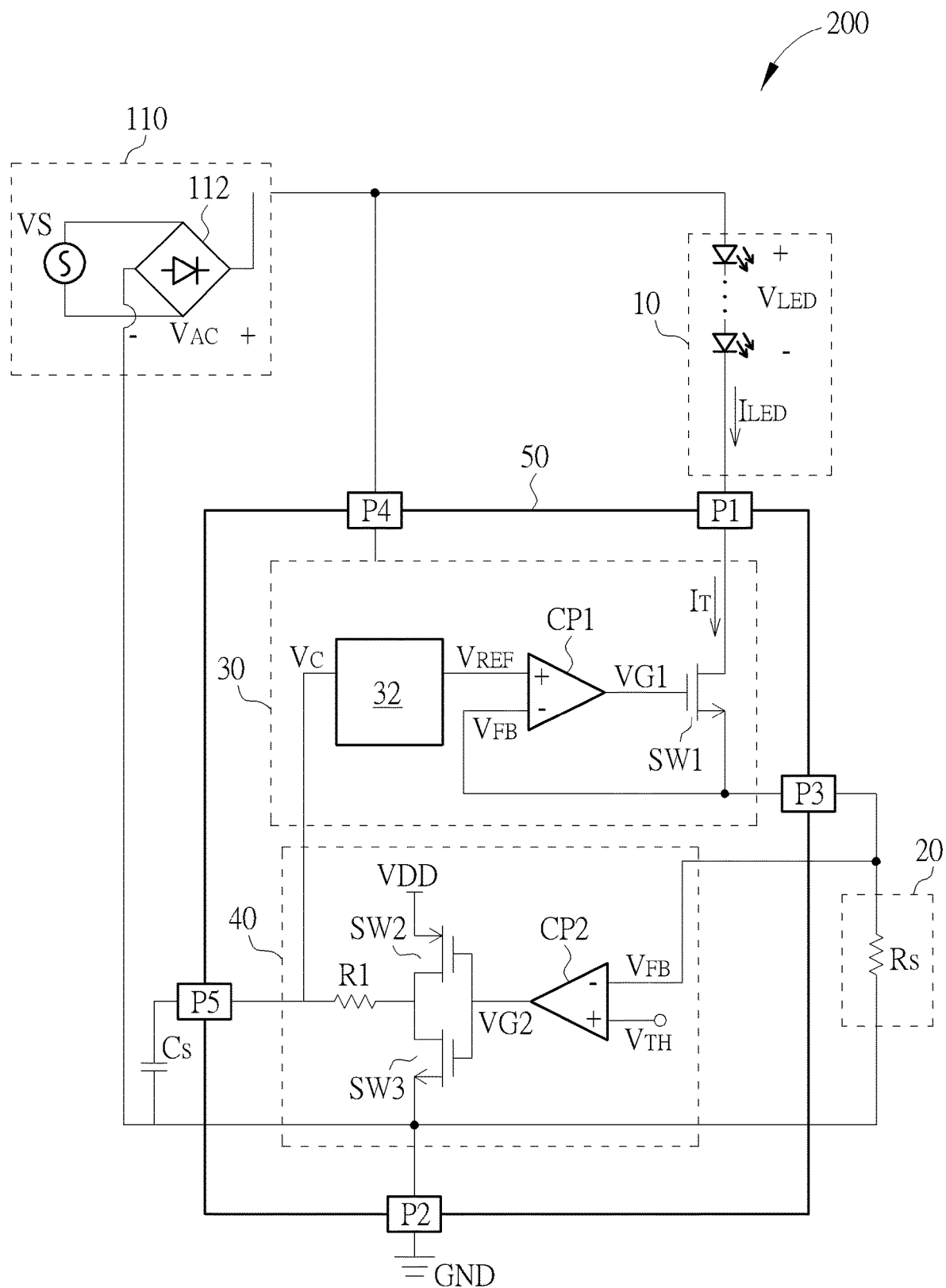
FIG. 2 is a diagram of an LED lighting device according to another embodiment of the present invention.
Figure 3:
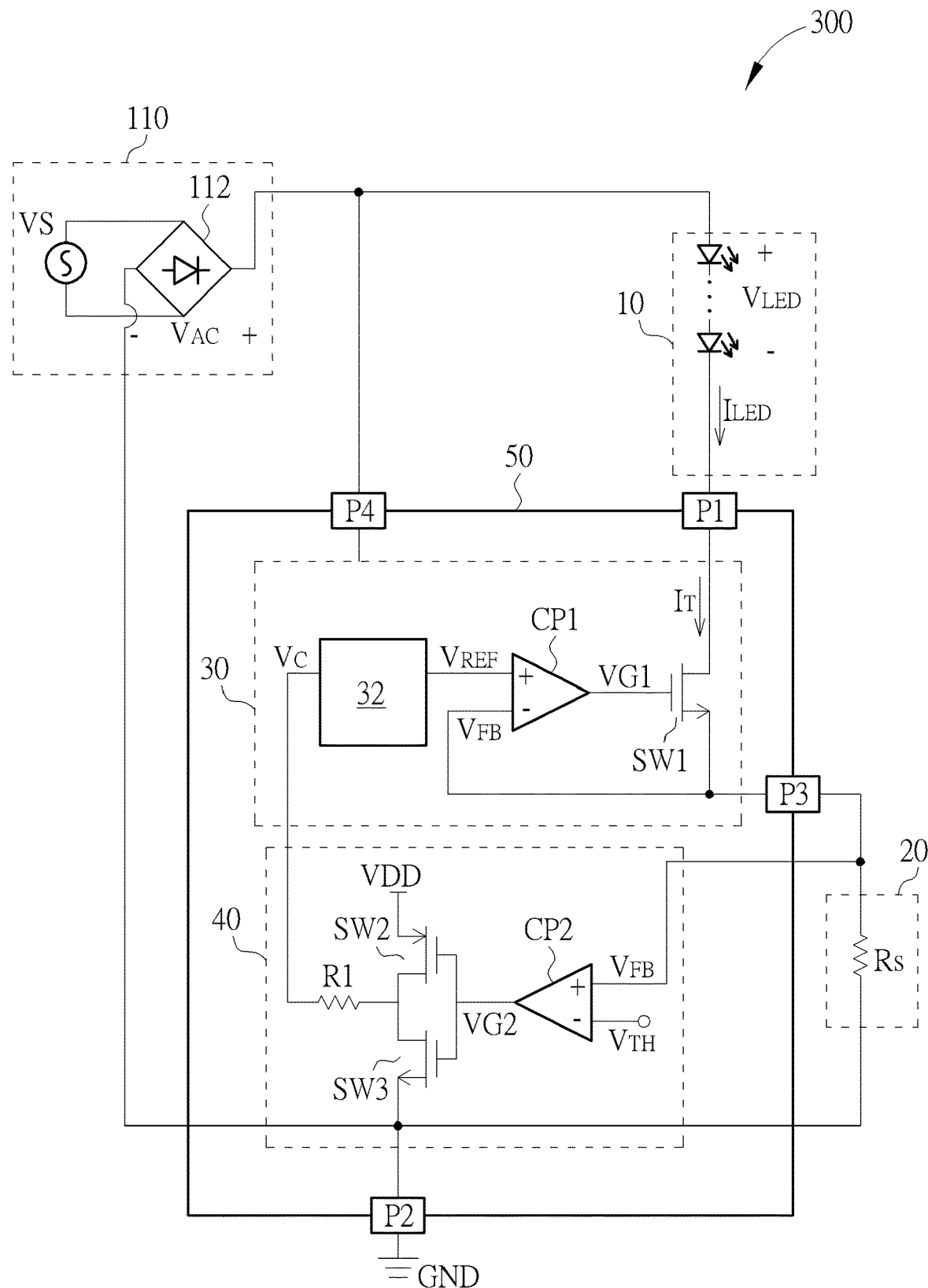
FIG. 3 is a diagram of an LED lighting device according to another embodiment of the present invention.
Figure 4:
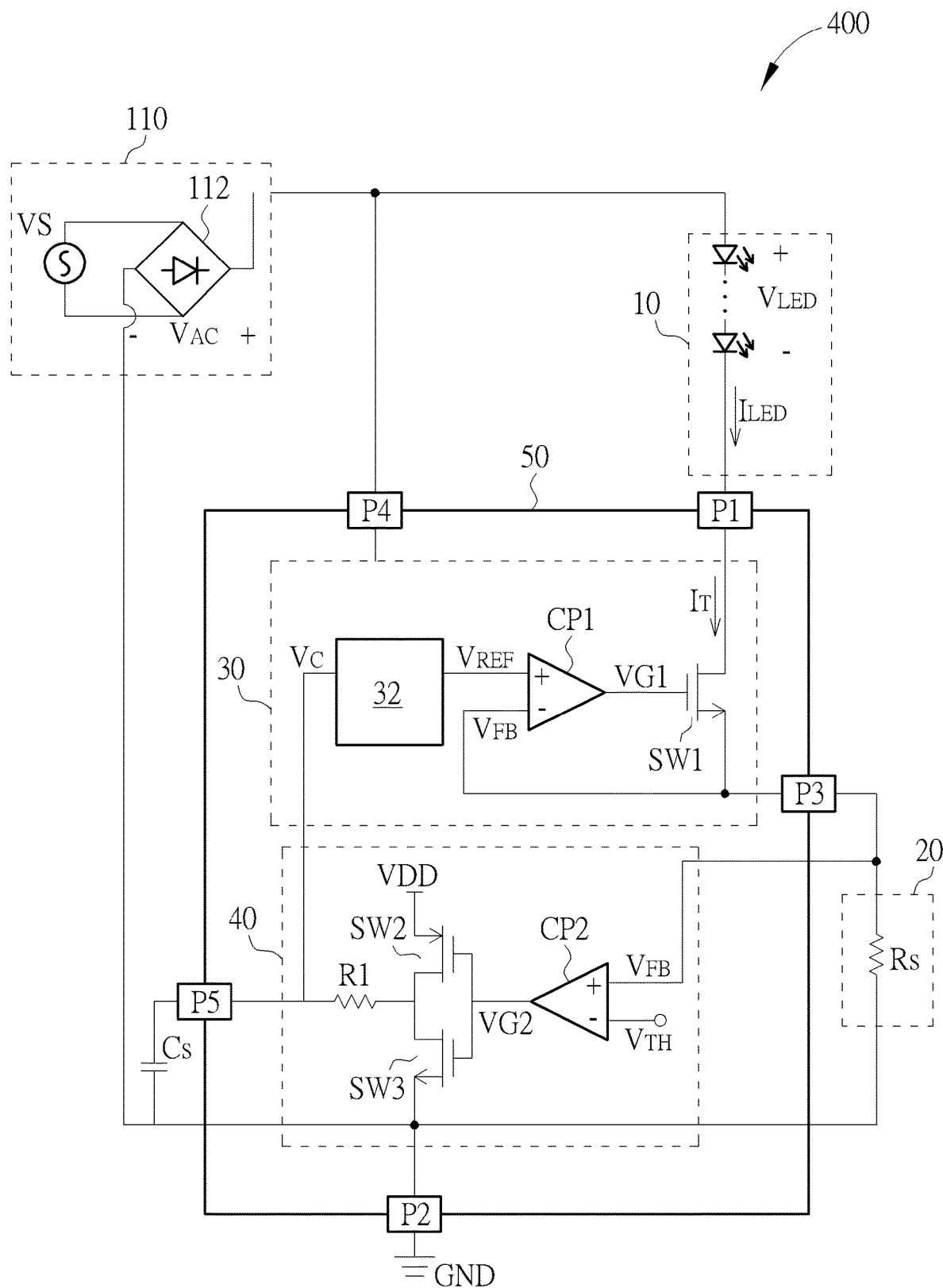
FIG. 4 is a diagram of an LED lighting device according to another embodiment of the present invention.

FIG. 1 is a diagram of an LED lighting device 100 according to an embodiment of the present invention. FIG. 2 is a diagram of an LED lighting device 200 according to another embodiment of the present invention. FIG. 3 is a diagram of an LED lighting device 300 according to another embodiment of the present invention. FIG. 4 is a diagram of an LED lighting device 400 according to another embodiment of the present invention. Each of the LED lighting devices 100, 200, 300 and 400 includes a power supply circuit 110, a luminescent device 10, a current detecting circuit 30, and a duty cycle detecting circuit 40.

In the LED lighting devices 100, 200, 300 and 400 depicted in FIGS. 1-4, the power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the LED lighting devices 100, 200, 300 and 400. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$, whose value varies periodically with time, for driving the LED lighting devices 100, 200, 300 and 400. However, the configuration of the power supply circuit 110 does not limit the scope of the present invention.

In the LED lighting devices 100, 200, 300 and 400 depicted in FIGS. 1-4, the luminescent device 10 may include a single LED or multiple LEDs coupled in series. FIGS. 1-4 depict the embodiment using multiple LEDs which may consist of single-junction LEDs, multi-junction high-voltage (HV) LEDs, or any combination of various types of LEDs. However, the types and configurations of the luminescent device 10 do not limit the scope of the present invention.

For illustrative purpose, the following symbols are used to designate related current and voltages during the operation of the LED lighting devices 100, 200, 300 and 400. $V_{LED}$ represents the voltage established across the luminescent device 10. $I_{LED}$ represents the current flowing through the luminescent device 10. $I_T$ represents the regulating current provided by the current regulating circuit 30.

In the LED lighting devices 100, 200, 300 and 400 depicted in FIGS. 1-4, the current detecting circuit 20 may include a detecting resistor Rs coupled between the current regulating circuit 30 and a ground voltage GND. The detecting resistor Rs may provide a feedback voltage $V_{FB}$ according to the regulating current $I_T$ provided by the current regulating circuit 30, wherein $V_{FB}=I_T*Rs$. However, the implementation of the current detecting circuit 20 does not limit the scope of the present invention.

In the LED lighting devices 100, 200, 300 and 400 depicted in FIGS. 1-4, the current regulating circuit 30 includes a switch SW1, a comparator CP1, and a reference voltage generator 32. The reference voltage generator 32 is configured to provide a reference voltage $V_{REF}$ according to a control signal Vc provided by the duty cycle detecting circuit 40. The switch SW1 includes a first end coupled to the luminescent device 10, a second end coupled to the ground voltage GND via the current detecting circuit 20, and a control end coupled to the output end of the comparator CP1 for receiving a switching signal VG1. The switch SW1 is configured to provide the regulating current $I_T$ according to the switching signal VG1 so that the value of the current $I_{LED}$ does not exceed the value of the regulating current $I_T$. The comparator CP1 includes a positive input end coupled to the reference voltage generator 32 for receiving the reference voltage $V_{REF}$, a negative input end coupled to the current detecting circuit 20 for receiving the feedback voltage $V_{FB}$, and an output end for outputting the switching signal VG1. According to the relationship between the feedback voltage $V_{FB}$ and the reference voltage $V_{REF}$, the comparator CP1 is configured to adjust the value of the switching signal VG1 which drives the switch SW1, thereby adjusting the value of the regulating current $I_T$. When $V_{FB}<V_{REF}$, the comparator CP1 is configured to output the switching signal VG1 having a higher level for increasing the regulating current $I_T$; when $V_{FB}>V_{REF}$, the comparator CP1 is configured to output the switching signal VG1 having a lower level for reducing the regulating current $I_T$. Therefore, when the current $I_{LED}$ decreases, the current regulating circuit 30 increases the regulating current $I_T$ until the value of the feedback voltage $V_{FB}$ reaches the value of the reference voltage $V_{REF}$; when the current $I_{LED}$ increases, the current regulating circuit 30 decreases the regulating current $I_T$ until the value of the feedback voltage $V_{FB}$ reaches the value of the reference voltage $V_{REF}$.

In an embodiment of the present invention, the switch SW1 in the current regulating circuit 30 may be a metal-oxide-semiconductor field-effect transistor (MOSFET), a bipolar junction transistor (BJT), or any device having similar function. In the embodiments depicted in FIGS. 1-4, the switch SW1 is an N-type transistor. However, the implementation of the switch SW1 does not limit the scope of the present invention.

For illustrative purpose, the switch SW1 implemented as an MOSFET is used to explain the present invention. When the current regulating circuit 30 is activated, the switch SW1 operates in the saturation region and provides the regulating current $I_T$ whose value is proportional to $(V_{GS}-V_{TH})^2$, wherein $V_{GS}$ is the gate-to-source voltage of the switch SW1 (the voltage drop between the control end and the second end of the switch SW1), and $V_{TH}$ is the threshold voltage of the switch SW1. Therefore, the comparator can adjust the value of the regulating current $I_T$ by outputting the switching signal VG1 having different levels.

In the LED lighting devices 100, 200, 300 and 400 depicted in FIGS. 1-4, the duty cycle detecting circuit 40 includes switches SW2-SW3, a comparator CP2, and a resistor R1. The duty cycle detecting circuit 40 is configured to detect the duty cycle of the regulating current $I_T$ according to the feedback voltage $V_{FB}$, thereby providing the corresponding control signal Vc. The switch SW2 includes a first end coupled to a bias voltage VDD, a second end coupled to the current regulating circuit 30 via the resistor R1, and a control end coupled to the output end of the comparator CP2 for receiving the switching signal VG2. The switch SW3 includes a first end coupled to the ground voltage GND, a second end coupled to the current regulating circuit 30 via the resistor R1, and a control end coupled to the output end of the comparator CP2 for receiving the switching signal VG2. The switches SW2 and SW3 have opposite doping types. More specifically, when receiving the switching signal VG2 having a specific level at the same time, one of the switches SW2 and SW3 is turned on and the other is turned off. In the present invention, each of the switches SW2 and SW3 may be a MOSFET, a BJT, or any device having similar function. In the embodiments depicted in FIGS. 1-4, the switch SW2 is a P-type transistor and the switch SW3 is an N-type transistor. However, the implementation of the switches SW2 and SW3 does not limit the scope of the present invention.

In the LED lighting devices 100 depicted in FIG. 1 and the LED lighting devices 200 depicted in FIG. 2, the comparator CP2 includes a positive input end coupled to a threshold voltage $V_{TH}$, a negative input end coupled to the current detecting circuit 20 for receiving the feedback voltage $V_{FB}$, and an output end for outputting the switching signal VG2. According to the relationship between the feedback voltage $V_{FB}$ and the threshold voltage $V_{TH}$, the comparator CP2 is configured to output the corresponding switching signal VG2 for controlling the operation of the switches SW2 and SW3. For illustrative purpose, it is assumed that the switch SW2 is a P-type transistor and the switch SW3 is an N-type transistor. When $V_{FB}>V_{TH}$, the comparator CP2 is configured to output the switching signal VG1 having a low level for turning on the switch SW2 and turning off the switch SW3, thereby biasing the control signal Vc at the bias voltage VDD via the resistor R1; when $V_{FB}<V_{TH}$, the comparator CP2 is configured to output the switching signal VG2 having a high level for turning on the switch SW3 and turning off the switch SW2, thereby biasing the control signal Vc at the ground voltage GND via the resistor R1.

Figure 5A:
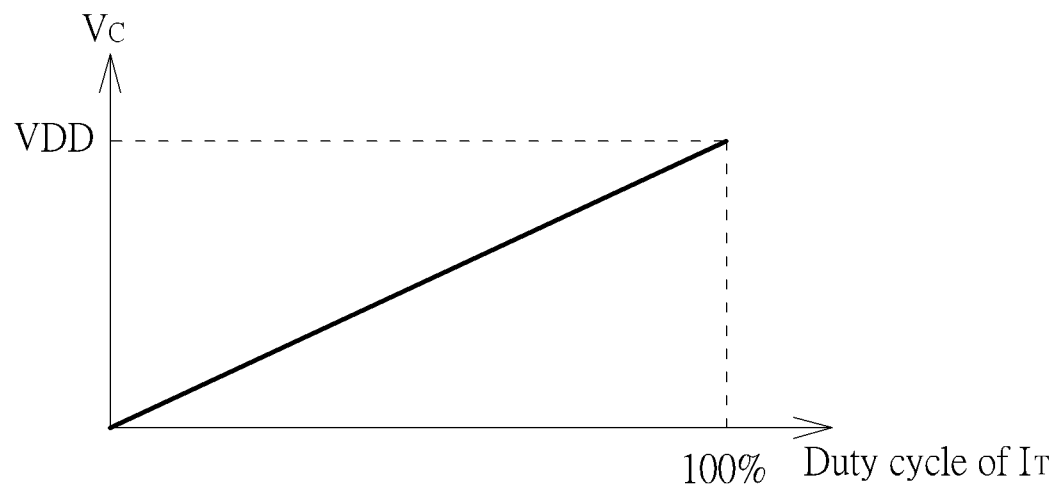
FIG. 5A is a diagram illustrating the waveforms of the relevant signals during the operation of an LED lighting device according to an embodiment of the present invention.
Figure 5B:
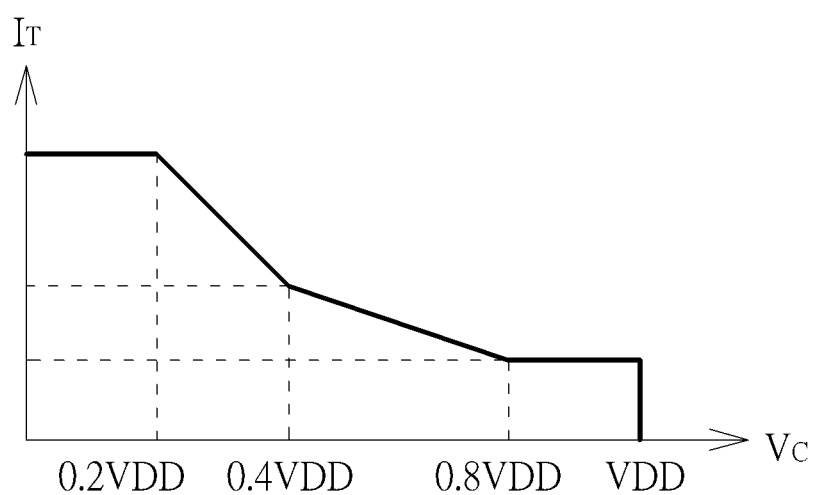
FIG. 5B is a diagram illustrating the waveforms of the relevant signals during the operation of an LED lighting device according to an embodiment of the present invention.

FIGS. 5A and 5B are diagrams illustrating the waveforms of the relevant signals during the operation of the LED lighting devices 100 and 200 according to an embodiment of the present invention. In FIG. 5A, the vertical axis represents the value of the control signal Vc, and the horizontal axis represents the duty cycle of the regulating current $I_T$. In FIG. 5B, the vertical axis represents the value of the regulating current $I_T$, and the horizontal axis represents the value of the control signal Vc. When the rectified AC voltage $V_{AC}$ is at its lower bound, the duty cycle of the regulating current $I_T$ and the value of the control signal Vc are smaller. Under such circumstance, the reference voltage generator 32 is configured to increase the value of reference voltage $V_{REF}$ according to the control signal Vc for increasing the value of the regulating current $I_T$, thereby achieving output stabilization. When the rectified AC voltage $V_{AC}$ is at its upper bound, the duty cycle of the regulating current $I_T$ and the value of the control signal Vc are larger. Under such circumstance, the reference voltage generator 32 is configured to decrease the value of reference voltage $V_{REF}$ according to the control signal Vc for reducing the value of the regulating current $I_T$, thereby achieving output stabilization.

In the LED lighting devices 300 depicted in FIG. 3 and the LED lighting devices 400 depicted in FIG. 4, the comparator CP2 includes a positive input end coupled between the second end of the switch SW1 and the detecting resistor Rs for receiving the feedback voltage $V_{FB}$, a negative input end coupled to a threshold voltage $V_{TH}$, and an output end for outputting the switching signal VG2. According to the relationship between the feedback voltage $V_{FB}$ and the threshold voltage $V_{TH}$, the comparator CP2 is configured to output the corresponding switching signal VG2 for controlling the operations of the switches SW2 and SW3. For illustrative purpose, it is assumed that the switch SW2 is a P-type transistor and the switch SW3 is an N-type transistor. When $V_{FB}>V_{TH}$, the comparator CP2 is configured to output the switching signal VG2 having a high level for turning off the switch SW2 and turning on the switch SW3, thereby biasing the control signal Vc at the ground voltage GND via the resistor R1; when $V_{FB}<V_{TH}$, the comparator CP2 is configured to output the switching signal VG2 having a low level for turning off the switch SW3 and turning on the switch SW2, thereby biasing the control signal Vc at the bias voltage VDD via the resistor R1.

Figure 6A:
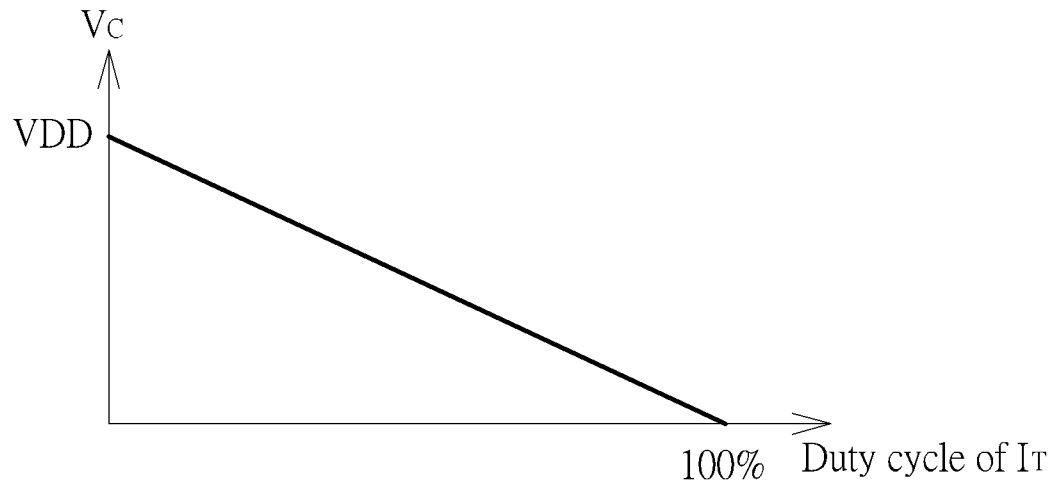
FIG. 6A is a diagram illustrating the waveforms of the relevant signals during the operation of an LED lighting device according to an embodiment of the present invention.
Figure 6B:
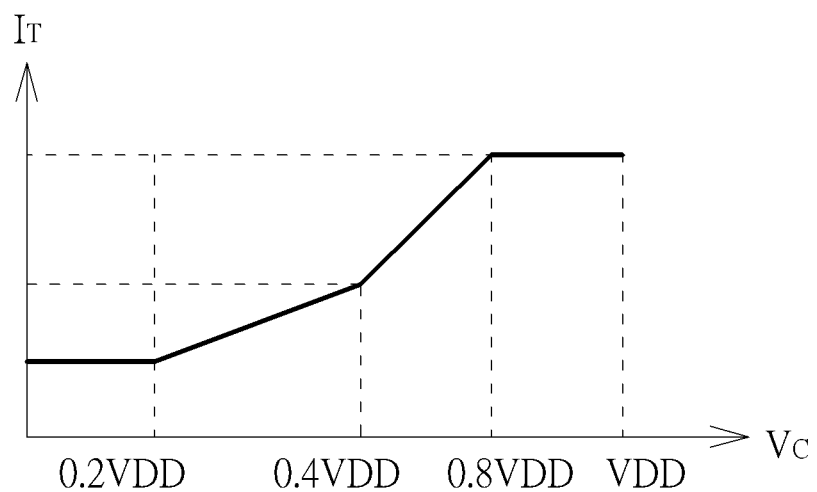
FIG. 6B is a diagram illustrating the waveforms of the relevant signals during the operation of an LED lighting device according to an embodiment of the present invention.

FIGS. 6A and 6B are diagrams illustrating the waveforms of the relevant signals during the operation of the LED lighting devices 300 and 400 according to an embodiment of the present invention. In FIG. 6A, the vertical axis represents the value of the control signal Vc, and the horizontal axis represents the duty cycle of the regulating current $I_T$. In FIG. 6B, the vertical axis represents the value of the regulating current $I_T$, and the horizontal axis represents the value of the control signal Vc. When the rectified AC voltage $V_{AC}$ is at its lower bound, the duty cycle of the regulating current $I_T$ is smaller and the value of the control signal Vc is larger. Under such circumstance, the reference voltage generator 32 is configured to increase the value of reference voltage \T$_{REF}$ according to the control signal Vc for increasing the value of the regulating current $I_T$, thereby achieving output stabilization. When the rectified AC voltage $V_{AC}$ is at its upper bound, the duty cycle of the regulating current $I_T$ is larger and the value of the control signal Vc is smaller. Under such circumstance, the reference voltage generator 32 is configured to decrease the value of reference voltage \T$_{REF}$ according to the control signal Vc for reducing the value of the regulating current $I_T$, thereby achieving output stabilization.

In the embodiments illustrated in FIGS. 5B and 6B, when the value of the control signal Vc is within a specific range (for example between 0.2VDD and 0.8VDD), the regulating current $I_T$ increases or decreases in a linear manner. In another embodiment, when the value of the control signal Vc is within a specific range, the regulating current $I_T$ may increase or decrease in a non-linear manner. However, the specific range or the way of adjusting the regulating current $I_T$ does not limit the scope of the present invention.

Figure 7:
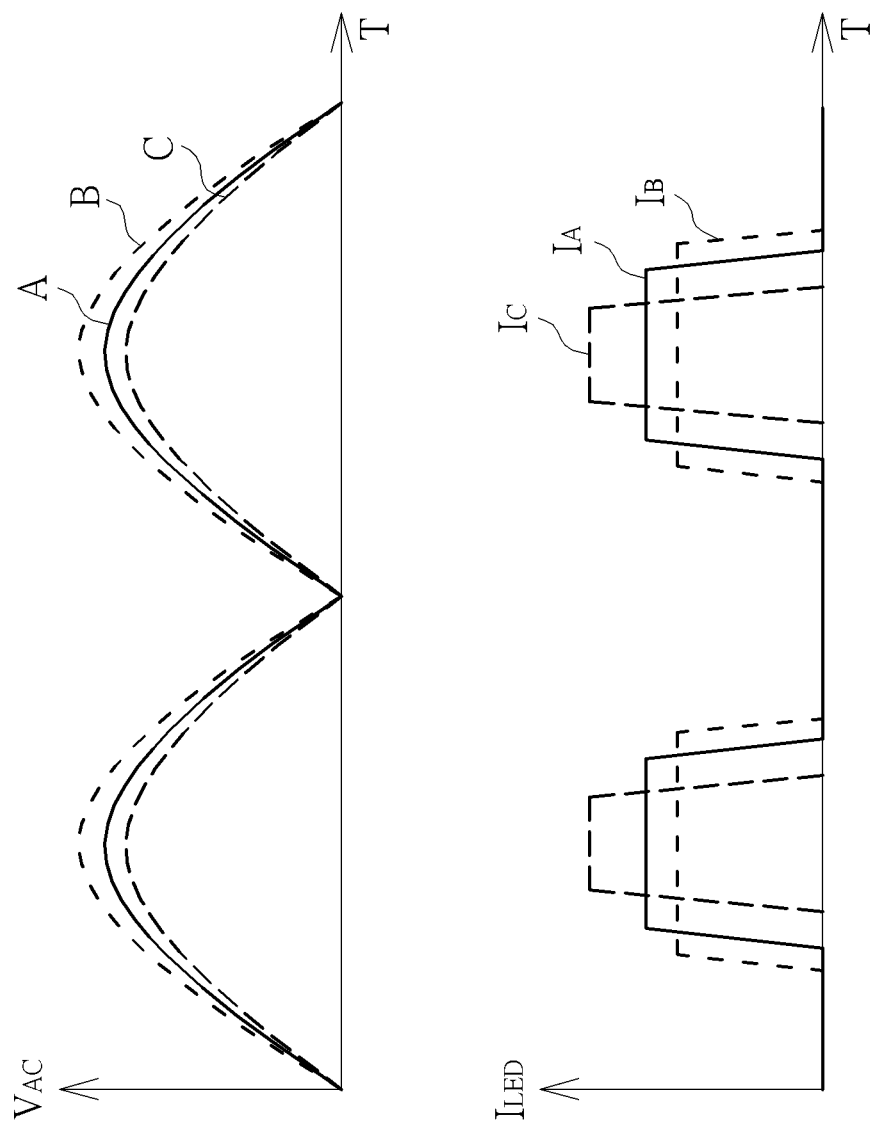
FIG. 7 is a diagram illustrating the waveforms of the relevant signals during the operation of an LED lighting device according to an embodiment of the present invention.

FIG. 7 is a diagram illustrating the waveforms of the relevant signals during the operation of the LED lighting devices 100, 200, 300 and 400 according to an embodiment of the present invention. In FIG. 7, curve A represents the rectified AC voltage $V_{AC}$ at its nominal bound, curve B represents the rectified AC voltage $V_{AC}$ at its upper bound, and curve C represents the rectified AC voltage $V_{AC}$ at its lower bound. $I_A$ represents the conducting current of the LED lighting devices 100, 200, 300 and 400 when driven by the rectified AC voltage $V_{AC}$ at its nominal bound. $I_B$ represents the conducting current of the LED lighting devices 100, 200, 300 and 400 when driven by the rectified AC voltage $V_{AC}$ at its upper bound. $I_C$ represents the conducting current of the LED lighting devices 100, 200, 300 and 400 when driven by the rectified AC voltage $V_{AC}$ at its lower bound.

The line regulation of the LED lighting device 100, 200, 300 or 400 is associated with the integral of its respective current $I_{LED}$ over time. As can be seen in FIG. 7, the present invention reduces the value of the regulating current $I_T$ when the duty cycle of the regulating current $I_T$ increases in response to the rectified AC voltage $V_{AC}$ at its upper bound, and increases the value of the regulating current $I_T$ when the duty cycle of the regulating current $I_T$ decreases in response to the rectified AC voltage $V_{AC}$ at its lower bound. Therefore, the present invention allows the average value of the current $I_A$ (or the average integral of the current $I_{LED}$ over time t), the average value of the current $I_B$ (or the average integral of the current $I_B$ over time t) and the average value of the current $I_C$ (or the average integral of the current $I_C$ over time t) to be as close to each other as possible, thereby improving the overall line regulation of the LED lighting devices 100, 200, 300 and 400.

In the embodiments illustrated in FIGS. 2 and 4, each of the LED lighting devices 200 and 400 further includes a charge storage unit Cs coupled between the duty cycle detecting circuit 40 and the ground voltage GND. The charge storage unit Cs and the switches SW2-SW3 in the duty cycle detecting circuit 40 function as an analog-to-digital converting circuit. When $V_{FB}>V_{TH}$, the charge storage unit Cs may be charged by the bias voltage VDD via the switch SW2 and the resistor R1; when $V_{FB}<V_{TH}$, the charge storage unit Cs may be discharged via the resistor R1 and the switch SW3. Therefore, the duty cycle of regulating current $I_T$ may be converted to a DC value for acquiring the relationship depicted in FIG. 5A.

In the LED lighting device 100 depicted in FIG. 1 and the LED lighting device 300 depicted in FIG. 3, the current regulating circuit 30 and the duty cycle detecting circuit 40 may be formed as a four-pin device in the same chip 50, wherein pin P1 is an input pin coupled to the luminescent device 10, pin P2 is a ground pin coupled to the ground voltage GND, pin P3 is a detecting pin coupled to the current detecting circuit 20, and pin P4 is a power pin coupled to the power supply circuit 110. However, the implementation of the current regulating circuit 30 and the duty cycle detecting circuit 40 does not limit the scope of the present invention.

In the LED lighting device 200 depicted in FIG. 2 and the LED lighting device 400 depicted in FIG. 4, the current regulating circuit 30 and the duty cycle detecting circuit 40 may be formed as a five-pin device in the same chip 50, wherein pin P1 is an input pin coupled to the luminescent device 10, pin P2 is a ground pin coupled to the ground voltage GND, pin P3 is a detecting pin coupled to the current detecting circuit 20, pin P4 is a power pin coupled to the power supply circuit 110, and pin P5 is a control pin coupled to the charge storage unit Cs. However, the implementation of the current regulating circuit 30 and the duty cycle detecting circuit 40 does not limit the scope of the present invention.

In the LED lighting devices 100, 200, 300 and 400 depicted in FIGS. 1-4, pin P4 is a power pin coupled to the power supply circuit 110. In another embodiment, the chip 50 may be powered via pin P1 and does not require pin P4.

The present invention may monitor the variation in the duty cycle of the luminescent device due to the variation in the rectified AC voltage $V_{AC}$, thereby adjusting the current flowing through the luminescent device by adjusting the value of the regulating current $I_T$. Even if the rectified AC voltage $V_{AC}$ somehow fluctuates between its upper bound and lower bound, the present invention may improve the overall line regulation of the LED lighting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device which improves line regulation, comprising:
  a current detecting circuit configured to monitor a first current and provide a feedback voltage associated with the first current;
  a duty cycle detecting circuit configured to monitor a duty cycle of the first current and provide a control signal associated with the duty cycle of the first current; and
  a current regulating circuit configured to:
    provide the first current for regulating a second current so that a value of the second current does not exceed a value of the first current, wherein the second current flows through a luminescent device driven by a rectified alternative-current (AC) voltage; and
    adjust the value of the first current according to the feedback voltage and the control signal; the current regulating circuit comprising:
      a first switch, comprising:
        a first end coupled to the luminescent device;
        a second end coupled to the current detecting circuit; and
        a control end coupled to a first switching signal; and
      a first comparator, comprising:
        a first input end coupled to a reference voltage;
        a second input end coupled to the current detecting circuit for receiving the feedback voltage; and
        an output end coupled to the control end of the first switch and configured to output the first switching signal according to a relationship between the reference voltage and the feedback voltage.

2. The LED lighting device of claim 1, wherein the current regulating circuit further comprises a reference voltage generator configured to provide the reference voltage according to the control signal.

3. The LED lighting device of claim 1, wherein the duty cycle detecting circuit comprises:
  a second switch, comprising:
    a first end coupled to a bias voltage;
    a second end for providing the control signal; and
    a control end coupled to a second switching signal;
  a third switch, comprising:
    a first end coupled to a ground voltage;
    a second end coupled to the second end of the second switch; and
    a control end coupled to the second switching signal; and
  a second comparator, comprising:
    a first input end coupled to a threshold voltage;
    a second input end coupled to the current detecting circuit for receiving the feedback voltage; and
    an output end coupled to the control end of the second switch and the control end of the third switch, and configured to output the second switching signal according to a relationship between the threshold voltage and the feedback voltage.

4. The LED lighting device of claim 3, wherein the duty cycle detecting circuit further comprises a resistor which includes:
  a first end coupled to the second end of the second switch and the second end of the third switch; and
  a second end coupled to the current regulating circuit.

5. The LED lighting device of claim 1, wherein the current detecting circuit comprises a detecting resistor coupled between the current regulating circuit and a ground voltage.

6. The LED lighting device of claim 1, wherein the current regulating circuit and the duty cycle detecting circuit are formed in a chip which includes:
  a first pin coupled to the luminescent device;
  a second pin coupled to a ground voltage; and
  a third pin coupled to the current detecting circuit.

7. The LED lighting device of claim 6, wherein the chip further includes a fourth pin coupled to the rectified AC voltage.

8. The LED lighting device of claim 1, further comprising a charge storage unit coupled between the duty cycle detecting circuit and a ground voltage.

9. The LED lighting device of claim 8, wherein the current regulating circuit and the duty cycle detecting circuit are formed in a chip which includes:
  a first pin coupled to the luminescent device;
  a second pin coupled to the ground voltage;
  a third pin coupled to the current detecting circuit;
  a fourth pin coupled to the charge storage unit.

10. The LED lighting device of claim 9, wherein the chip further includes a fifth pin coupled to the rectified AC voltage.

11. The LED lighting device of claim 1, further comprising a power supply circuit for providing the rectified AC voltage.

12. A light-emitting diode (LED) lighting device which improves line regulation, comprising:
  a current detecting circuit configured to monitor a first current and provide a feedback voltage associated with the first current;
  a duty cycle detecting circuit configured to monitor a duty cycle of the first current and provide a control signal associated with the duty cycle of the first current, and comprising:
    a first switch, comprising:
      a first end coupled to a bias voltage;
      a second end for providing the control signal; and
      a control end coupled to a switching signal;
    a second switch, comprising:
      a first end coupled to a ground voltage;
      a second end coupled to the second end of the first switch; and
      a control end coupled to the switching signal; and
    a comparator, comprising:
      a first input end coupled to a threshold voltage;
      a second input end coupled to the current detecting circuit for receiving the feedback voltage; and
      an output end coupled to the control end of the first switch and the control end of the second switch, and configured to output the switching signal according to a relationship between the threshold voltage and the feedback voltage; and
  a current regulating circuit configured to:
    provide the first current for regulating a second current so that a value of the second current does not exceed a value of the first current, wherein the second current flows through a luminescent device driven by a rectified alternative-current (AC) voltage; and
    adjust the value of the first current according to the feedback voltage and the control signal.

13. The LED lighting device of claim 12, wherein the duty cycle detecting circuit further comprises a resistor which includes:
  a first end coupled to the second end of the first switch and the second end of the second switch; and
  a second end coupled to the current regulating circuit.

14. The LED lighting device of claim 12, wherein the current detecting circuit comprises a detecting resistor coupled between the current regulating circuit and the ground voltage.

15. The LED lighting device of claim 12, wherein the current regulating circuit and the duty cycle detecting circuit are formed in a chip which includes:
 a first pin coupled to the luminescent device;
 a second pin coupled to the ground voltage; and
 a third pin coupled to the current detecting circuit.

16. The LED lighting device of claim 15, wherein the chip further includes a fourth pin coupled to the rectified AC voltage.

17. The LED lighting device of claim 12, further comprising a charge storage unit coupled between the duty cycle detecting circuit and the ground voltage.

18. The LED lighting device of claim 17, wherein the current regulating circuit and the duty cycle detecting circuit are formed in a chip which includes:
 a first pin coupled to the luminescent device;
 a second pin coupled to the ground voltage;
 a third pin coupled to the current detecting circuit;
 a fourth pin coupled to the charge storage unit.

19. The LED lighting device of claim 18, wherein the chip further includes a fifth pin coupled to the rectified AC voltage.

20. The LED lighting device of claim 12, further comprising a power supply circuit for providing the rectified AC voltage.

\* \* \* \* \*